(12) United States Patent
Andersen et al.

(10) Patent No.: US 10,982,656 B2
(45) Date of Patent: Apr. 20, 2021

(54) WIND TURBINE WITH LIGHTNING PROTECTION SYSTEM

(71) Applicant: LM WP PATENT HOLDING A/S, Kolding (DK)

(72) Inventors: Knud Møller Andersen, Herning (DK); Ole Kiel Jensen, Gistrup (DK); Richard Baker, Lichfield (GB); Lars Bo Hansen, Agerskov (DK)

(73) Assignee: LM WP PATENT HOLDING A/S, Kolding (DK)

( * ) Notice: Subject to any disclaimer, the term of this patent is extended or adjusted under 35 U.S.C. 154(b) by 737 days.

(21) Appl. No.: 15/542,773

(22) PCT Filed: Jan. 12, 2016

(86) PCT No.: PCT/EP2016/050463
§ 371 (c)(1),
(2) Date: Jul. 11, 2017

(87) PCT Pub. No.: WO2016/113249
PCT Pub. Date: Jul. 21, 2016

(65) Prior Publication Data
US 2018/0010583 A1   Jan. 11, 2018

(30) Foreign Application Priority Data

Jan. 12, 2015   (EP) ..................................... 15150790

(51) Int. Cl.
*F03D 80/30*   (2016.01)
*F03D 1/06*    (2006.01)
(Continued)

(52) U.S. Cl.
CPC ........... *F03D 80/30* (2016.05); *F03D 1/0675* (2013.01); *H01Q 1/50* (2013.01); *H01R 4/66* (2013.01); *H02G 13/40* (2013.01); *Y02E 10/72* (2013.01)

(58) Field of Classification Search
CPC ......... F03D 80/30; F03D 1/0675; H01R 4/66; H02G 13/40; H01Q 1/50; Y02E 10/721
(Continued)

(56) References Cited

U.S. PATENT DOCUMENTS

2016/0090968 A1\*  3/2016  Hansen ................... F03D 80/30
                                                            416/146 R

FOREIGN PATENT DOCUMENTS

EP       0633622 A1 \*  1/1995  ............... H01Q 1/50
EP       0633622 A1     1/1995
(Continued)

OTHER PUBLICATIONS

European Search Report dated Jun. 25, 2015 corresponding to application No. EP15150790.
(Continued)

*Primary Examiner* — Joseph J Dallo
*Assistant Examiner* — Scott A Reinbold
(74) *Attorney, Agent, or Firm* — Nath, Goldberg & Meyer; Jerald L. Meyer; Tanya E. Harkins (57) ABSTRACT

The present invention relates to a wind turbine comprising a lightning protection system comprising a waveguide interconnecting a communication device and a signal-carrying structure. In other aspects, the present invention relates to the use of a waveguide in a lightning protection system of a wind turbine, a power splitter and its use in a lightning protection system of a wind turbine.

10 Claims, 4 Drawing Sheets

(51) Int. Cl.
*H01Q 1/50* (2006.01)
*H01R 4/66* (2006.01)
*H02G 13/00* (2006.01)

(58) Field of Classification Search
USPC .......................................................... 416/146
See application file for complete search history.

(56) References Cited

FOREIGN PATENT DOCUMENTS

WO            2014187895 A1    11/2014
WO     WO-2014187895 A1 * 11/2014 ........... F03D 1/0675

OTHER PUBLICATIONS

International Search Report dated Jun. 20, 2016 corresponding to application No. PCT/EP2016/050463.
Written Opinion of the International Searching Authority dated Jun. 20, 2016 corresponding to application No. PCT/EP2016/050463.

* cited by examiner

WIND TURBINE WITH LIGHTNING PROTECTION SYSTEM

This is a National Phase Application filed under 35 U.S.C. 371 as a national stage of PCT/EP2016/050463, filed Jan. 12, 2016, an application claiming the benefit of European Application No. 15150790.2, filed Jan. 12, 2015, the content of each of which is hereby incorporated by reference in its entirety.

FIELD OF THE INVENTION

The present invention relates to a wind turbine comprising a lightning protection system. In other aspects, the present invention relates to the use of a waveguide in a lightning protection system of a wind turbine, a power splitter and its use in a lightning protection system of a wind turbine.

BACKGROUND OF THE INVENTION

Lightning protection of blade and blade components, especially electronic parts, in a wind turbine blade is important in that the lightning current may be very damaging. Therefore, blades may be equipped with receptors receiving the lightning and down conductors for conducting the lightning current to a ground potential. This however may not be enough to protect electronic components located in the blade against damage caused by a lightning current.

International Patent Application WO 2014/187895 A1 describes a lightning protection system for a wind turbine blade, the system comprising a conductive band positioned around the circumference of the blade at the longitudinal location a communication device, wherein the conductive band is coupled with a lightning down conductor for connection to a ground plane. A signal-carrying coaxial cable is incorporated into the interior of the lightning down conductor in a common cable, wherein the lightning down conductor is configured to shield the internal signal-carrying structure.

While such prior art system may afford some degree of protection of electronics from lightning strikes they typically provide unsatisfactory protection against flashover of lighting current between conductors having great differences in electric potential.

Therefore, it is an object of the invention to provide a wind turbine blade with a lightning protection system affording an improved level of protection for electronic parts, especially communication devices, located within the blade.

It is another object of the present invention to provide a wind turbine blade with a lightning protection system having improved performance as compared to prior art systems.

SUMMARY OF THE INVENTION

In a first aspect, the present invention relates to a wind turbine comprising at least one turbine blade and a lightning protection system, the turbine blade extending in a longitudinal direction parallel to a longitudinal axis and having a tip end and a root end, wherein the wind turbine comprises
- at least one communication device located within the wind turbine;
- at least one antenna connected to the communication device;
- at least one signal-carrying structure for transferring a signal between the communication device and the at least one antenna;
- at least one waveguide interconnecting the communication device and the signal-carrying structure;
- at least one lightning receptor;
- at least one lightning down conductor connected to the lightning receptor for conducting lightning current to the root end of the blade for connection to a ground plane;

wherein the signal-carrying structure and the lightning down conductor are short-circuited at one or more locations within the blade.

Preferably, the at least one communication device is located within the wind turbine blade. Even more preferably, the at least one communication device, the at least one antenna, the at least one signal-carrying structure, the at least one waveguide, the at least one lightning receptor and the at least one lightning down conductor are located within the blade.

Typically, the wind turbine blade will comprise a profiled contour including a pressure side and a suction side, as well as a leading edge and a trailing edge with a chord having a chord length extending there between, the profiled contour, when being impacted by an incident airflow, generating a lift.

The communication device will typically comprise several electronic components such as one or more transmitters, receivers, data processors, amplifiers and/or sensors. The mentioned components are likely to be destroyed or damaged if lightning current enters the communication device. It is therefore necessary to separate lightning current from other signals entering and leaving the communication device.

Preferably, the communication device is located as close to the root end of the blade as technical and physical possible to minimise impact occurring from lightning currents.

In one embodiment, the communication device comprises at least a radio signal receiver and a data processor. This is advantageous in that the communication device then is able to receive and process signals from one or more of the antennas. Furthermore, the communication device may comprise a radio signal transmitter enabling the communication device to transmit a radio signal, receive a radio signal and process the radio signal. The received signal is preferably a reply from an antenna to a signal sent from a transmitter. Such transmitter may be part of the communication device or located external to the communication device.

In one embodiment, the communication device comprises a radio signal transmitter, a radio signal receiver and a data processor for processing data such as the received radio signal from an antenna. This allows for time-of-flight measurements, e.g. to monitor blade deflection.

The communication device may furthermore comprise a blade sensor facilitating measuring information representing blade orientation. Examples of information representing blade orientation could be acceleration or speed of movement of the blade sensor and thereby of the blade. A further example could be rotational position of the blade sensor device in relation to the earth gravity also simply referred to as gravity. The preferred examples of blade orientation are blade pitch angle and blade azimuth angle.

Preferably, the antenna is an antenna suitable to broadcast an ultra-wide band signal (UWB).

According to one embodiment of the invention, at least one of antennas is a tip antenna located at the tip end of the blade. The tip end of the blade is defined as less than eight meters preferably less than one meter from the tip end of the blade.

Preferably, the one or more tip antenna(s) is located inside the blade, alternatively such tip antenna(s) may be at least partly moulded into the structure of the blade. Preferably, the tip antenna is an antenna transmitting a signal to a root antenna.

According to an embodiment of the invention, at least one of the one or more antennas is a blade antenna located between 4 meters and 10 meters longitudinal distance from the tip of the blade. Preferably, the blade antenna is located at a distance of around 5 meters from tip of the blade. Advantageously, the one or more tip and or blade antenna(s) is located inside the blade. Alternatively, the antenna(s) may be at least partly moulded into the structure of the blade. Preferably, the blade antenna is an antenna transmitting a signal to the root antenna.

According to an embodiment of the invention, at least one of the one or more antennas is a root antenna located outside the blade. Preferably, the root antenna(s) are located outside the blade at the root end of the blade. The root end of the blade is defined as less than four meters preferably less than one meter from the joint between the blade and the hub of the wind turbine. Preferably, the root antenna is spaced from the surface of the blade; hence, advantageously the root antenna is mounted on brackets. Preferably, the root antenna is an antenna receiving a signal from a tip and/or a blade antenna.

Typically, the signal will be a radio frequency (RF) signal. RF electromagnetic waves are capable of spreading through free space as the inside of a waveguide.

The necessary separation of lightning current is obtained by inserting a waveguide between the signal-carrying structure and the communication device. The waveguide separates lightning current from e.g. radio signals and facilitates that the lightning current can be conducted away from the waveguide/communication device. Thereby the components of the communication device are protected from lightning currents. Advantageously, a first end of the waveguide is connected to a communication device and the second end of the waveguide is connected to the signal-carrying structure, such as a coaxial cable. In this way signals between an antenna and a communication device pass through the waveguide.

Depending on type of waveguide, one waveguide may protect more than one communication device from lightning currents. In addition, each electric and/or communicative connection may have one waveguide in a 1:1 configuration.

In an advantageous embodiment, the signal-carrying structure, such as the centre conductor and shield conductor of a coaxial cable, is connected to the waveguide at least partly by means of soldering. It is advantageous to fasten conductor(s) to the waveguide by means of soldering, brazing or welding in the situations where these conductors facilitate carrying at least part of the lightning current. Further, it may be advantageous also to use one or more screws to fasten at least one of these conductors, especially if the waveguide comprises an end launcher to which the signal-carrying structure, such as the centre conductor and shield conductor of a coaxial cable, has to be connected.

The lightning receptor is preferably located within the tip end region of the blade. There can be more than one receptor along the blade and the receptor design may be chosen from a variety of different geometrical forms including a band around the blade. The down conductor is connected to each of the receptors and in case of lightning strikes, the down conductor conducts lightning current to a ground potential.

According to a preferred embodiment, the lighting down conductor is connected to one or more receptors in the tip end region of the blade, i.e. less than eight meters preferably less than one meter, from the tip end of the blade. Similarly, the signal-carrying structure may be connected to an antenna in the tip end region of the blade. At one location, typically in the tip end region of the blade, these conductors are short-circuited enabling lightning current flow through the blade in each of the conductors.

The down conductor is capable of conducting currents occurring from a lightning strike of a wind turbine blade and typically, the down conductor is connected to a lightning receptor in one end and a ground potential or connection hereto in the second end.

In one embodiment, the dimension of the lightning down conductor is between 35 mm$^2$ and 70 mm$^2$. The dimension of the down conductor depends on the material of the down conductor and on whether the down conductor has to carry the entire lightning current alone or not. In the former case, the dimension of the down conductor is preferably 50 mm$^2$ CU or 70 mm$^2$ ALU or other conducting material vs dimension that give equivalent lightning current conduction capability. The latter case may occur if e.g. the lightning current is also at least partly carried by a second conductor such as the signal-carrying structure. In this case, the dimension of the down conductor depends on the type of coax cable and according to embodiments of this invention; the dimension of the down conductor may be below 50 mm$^2$.

Preferably, the short circuit is a direct current (DC) short circuit. The short circuit between the lightning down conductor and the signal-carrying structure is advantageous in that the connected conductors each are carrying part of the lightning current and thereby the dimensions of e.g. the lighting down conductor or parts thereof may be reduced. More importantly, the short-circuit ensures that the electric potential across the insulation of the different conductors of the lightning down conductor and the signal-carrying structure is low and non-destructive in case of lightning current passing.

At the waveguide, which is typically in the root end region of the blade, the three conductors are again preferably separated. Typically, the signal carrying conductor(s) are connected to the waveguide and the lightning down conductor is connected to an additional down conductor. These connections facilitate that the waveguide and the communication device attached hereto acts as a "dead end" for the lightning current, which then continues to ground or ground potential via the additional down conductor. The communication device is usually electrically isolated/galvanically separated from the rest of the wind turbine. The waveguide may act as a common terminal for the lightning current conducting parts of the lightning conductor and the additional lightning carrying conductor.

In an advantageous embodiment, the signal-carrying structure comprises one or more signal-carrying coaxial cables, each coaxial cable comprising a centre conductor surrounded by a first tubular insulating layer enclosed by a tubular shield conductor.

At least the centre conductor passes the signal between the one or more antennas and the communication device. Coaxial cables are preferred in situations where the conductor carries high frequency radio signals between the communication device and the antennas in that the coax cable design is optimised for this purpose. In one embodiment, the tubular shield conductor is corrugated.

In one embodiment, the coaxial cable is a 50 ohm type coaxial cable. The type of coaxial cable is preferably 50 ohm for obtaining the best signal noise ratio when transmitting a radio signal between 3 and 5 GHz through a blade having the length of 30 to 80 meters or more. The optimum depends on the dielectric between the centre conductor and the shield, but is usually in the 50-70 ohm range. Typically, the standard 50/75 ohm cables are chosen.

The signal-carrying structure may comprise several signal-carrying coaxial cables, typically interconnected by one or more splitters or ground returns as discussed below. Each of several antennas may be connected to the communication device by its respective coaxial cable via respective waveguides.

In a preferred embodiment, one or more of the signal-carrying coaxial cables is at least over part of its length integrated into a three-conductor cable comprising a second tubular insulating layer surrounding the tubular shield conductor, the second tubular insulating layer being surrounded by at least part of the lightning down conductor.

The three-conductor cable has the advantage that it minimises the number of cables that need to be installed in the blade. In a preferred embodiment of such three-conductor cable, the lightning down conductor has the form of a tubular shield or sock applied outside the other conductors. Further it is advantageous if the integration also includes an isolating layer outside the sock in that electric arcs between cable an e.g. blade components then are avoided or at least significantly reduced.

According to an embodiment of the invention, the lightning down conductor encapsulates the conductor preferably by a sock made of a current conducting material. Since the lightning currents are high enough to destroy electronics and interfere with communication signals these currents are preferably conducted from blade to ground via a predefined lightning current path, wherein the predefined lightning current path is conducting the current along a path which facilitates no damage to electronics and less interference of communication signals. Advantageously at least part of such predefined lightning current path is a sock preferably made of a metal encapsulating the signal-carrying conductor(s) between the antennas and the communication device.

The metal sock is preferably made of aluminium due to the current conducting capabilities of aluminium, but could also be made of other materials capable of conducting current such as copper.

In one embodiment, the three-conductor cable comprises a third insulating layer isolating the lightning down conductor, e.g. the sock, from the surroundings. The layer of insulation outside the sock ensures that the lightning current follows the outer sock in a predefined lightning current path. The predefined lightning current path typically starts at the blade tip and ends at the ground where the foundation of the wind turbine is made.

In an alternative embodiment of the three-conductor cable, there is no isolating layer between the shield conductor of the coax cable and lightning conductor, such as the outer sock.

In a particularly preferred embodiment, the signal-carrying structure comprises at least one power splitter for splitting and transferring radio frequency power, the power splitter comprising one input port and at least two output ports, each port being adapted to connectively receive a signal-carrying cable, wherein the input port is connected to each of the output ports such that a radio frequency signal received at the input port is split to the output ports. Preferably, the signal is split substantially equal to the output ports. The splitter enables a radio frequency signal transmitted from the communication device and reaching the input port to be split and transferred to a first output port, which may receive a signal-carrying coaxial cable leading to a blade antenna, and to a second output port, which may receive another signal-carrying coaxial cable leading to a tip antenna. Another option is to have an unequal split, e.g. to pass more power to the antenna with the longest cable and longest transmission path and less power to the other antenna.

In another embodiment, the power splitter comprises a conductive housing connected to the input port to enable a direct current short-circuit of the housing and the input port. This enables lightning current received at the conductive housing, by means of a lightning down conductor mounted either to the housing or to one of the output ports of the splitter to pass the splitter and to be transferred to the input port for further transfer to ground. In addition, by establishing a direct current short circuit the lightning current can be distributed over all three conductors of a three-conductor cable connected to the input port and the electric potential difference between the conductors can be minimized.

In another embodiment, the signal-carrying structure is short-circuited with the lightning down conductor at the power splitter. In another embodiment, the input port and at least one of the output ports is adapted to connectively receive the three-conductor cable described above.

According to a preferred embodiment, the blade also comprises a ground return for transferring radio frequency power and lightning current, the ground return comprising an input port and an output port, each port being adapted to connectively receive a signal-carrying cable, wherein the input port is connected to the output port such that a radio frequency signal received at the input port is transferred to the output port, the ground return having a conductive housing comprising connection means for connectively receiving the end of a conductor connected to a lightning receptor, wherein the ground return enables a direct current short-circuit of the housing and the input port. Preferably, the input port of the ground return is adapted to receive a three-conductor cable as described above. Advantageously, the ground return is placed within the tip end region of the blade.

In a particularly preferred embodiment, the wind turbine blade comprises a lightning receptor connected to the conductive housing of the ground return, a first antenna connected to the output port of the ground return by way of a signal-carrying coaxial cable, a first three-conductor cable as described above connected to the input port of the ground return, the opposing end of said first three-conductor cable being connected to a first output port of a power splitter as described above, a second antenna connected to a second output port of the power splitter by way of a signal-carrying coaxial cable, a second three-conductor cable connected to the input port of the splitter, the opposing end of said second three-conductor cable being connected to a waveguide, the waveguide being connected to a communication device. Preferably, one or two additional antennas are connected to the communication device via respective waveguides.

In another embodiment, the blade comprises two or more antennas placed at different longitudinal distances to the tip end of the blade. Advantageously, the blade comprises a first and a second antenna, the first antenna being placed within one meter longitudinal distance from the tip end of the blade, and wherein the second antenna is placed between four and ten meters longitudinal distance from the tip end of the blade.

Typically, the signal is a radio frequency signal.

In another aspect, the present invention relates to a wind turbine blade comprising a lightning protection system, the wind turbine blade extending in a longitudinal direction parallel to a longitudinal axis and having a tip end and a root end, wherein the blade comprises
- at least one communication device located within the blade;
- at least one antenna connected to the communication device;
- at least one signal-carrying structure for transferring a signal between the communication device and the at least one antenna;
- at least one waveguide interconnecting the communication device and the signal-carrying structure;
- at least one lightning receptor;
- at least one lightning down conductor connected to the lightning receptor for conducting lightning current to the root end of the blade for connection to a ground plane;

wherein the signal-carrying structure and the lightning down conductor are short-circuited at one or more locations within the blade.

In another aspect, the present invention relates to the use of a waveguide in a lightning protection system of a wind turbine, wherein the waveguide interconnects a communication device located within the turbine and a signal-carrying structure connected to at least one antenna. This enables obtaining separation of lightning current and radio signal transferred possibly present on a signal-carrying structure. Preferably, the communication device and the signal-carrying structure are located within a blade of the wind turbine. Thereby it is possible to have electronics in the blade of a wind turbine with very little risk of damage due to lighting current In a preferred embodiment of the use of the waveguide, the signal-carrying structure is short-circuited with a lightning down conductor at one or more locations within the blade, wherein the waveguide is used for preventing lightning current conducted by the signal-carrying structure from entering the communication device.

In another aspect, the present invention relates to a power splitter for splitting and transferring radio frequency power within a wind turbine blade, the power splitter comprising one input port and at least two output ports, each port being adapted to connectively receive a signal-carrying cable, wherein the input port is connected to each of the output ports such that a radio frequency signal received at the input port is split to the output ports, and wherein the power splitter comprises a conductive housing connected to the input port to enable a direct current short-circuit of the housing and the input port. Preferably, the signal is split substantially equal.

Preferably, the input port and at least one of the output ports is adapted to connectively receive a three-conductor cable comprising a signal-carrying center conductor surrounded by a first tubular insulating layer enclosed by a tubular shield conductor, the tubular shield conductor being surrounded by a second tubular insulating layer, the second tubular insulating layer being surrounded by a third conductor.

In another aspect, the present invention relates to the use of the above-described power splitter in a lightning protection system of a wind turbine blade.

As used herein, the term "waveguide" refers to a hollow conducting structure, such as a hollow metal tube or metal box, suitable for acting as a transmission line for electromagnetic waves of radio frequency. A waveguide acts as a high pass filter allowing electromagnetic waves above a certain cut-off frequency to pass through the waveguide (typically radio frequency waves), whereas most of the electromagnetic energy below the cut-off frequency, such as lightning current, will be attenuated by the waveguide. The cross section may have one of the following shapes: square, rectangular, circular, elliptical, dual-ridge (H-shaped) or single-ridge (U-shaped). The cut-off frequency, dispersion and/or attenuation will depend on the cross-section.

As used herein, the term "substantially equal" means a power split in which each resulting output signal is within +/−10% or the other output signal(s).

Moreover, the invention relates to a wind turbine blade having a predefined lightning current path, the predefined lightning current path includes at least a lightning receptor located in the blade, a down conductor located inside the blade and an additional down conductor connecting the down conductor to a ground potential characterised in that the predefined lightning current path bypasses a waveguide. Preferably, the waveguide is located in the blade. Preferably, the additional down conductor is connected to the down conductor at the connection of the down conductor to the waveguide. Alternatively, the connection of the down conductor and the additional down conductor is isolated from the waveguide. The conductor is preferably carrying a communication signal between an antenna located in the blade and a communication device preferably the antenna is located at the opposite end of the conductor than the waveguide.

According to a preferred embodiment, the predefined lightning current path is at least partly implemented as a sock encapsulating a signal-carrying structure implemented as a coaxial cable in the blade.

It will be apparent to the skilled reader, that the embodiments discussed herein may be combined with each other.

FIGURES

A few exemplary embodiments of the invention will be described in more detail in the following with reference to the figures, of which

DETAILED DESCRIPTION OF THE INVENTION

Figure 1:
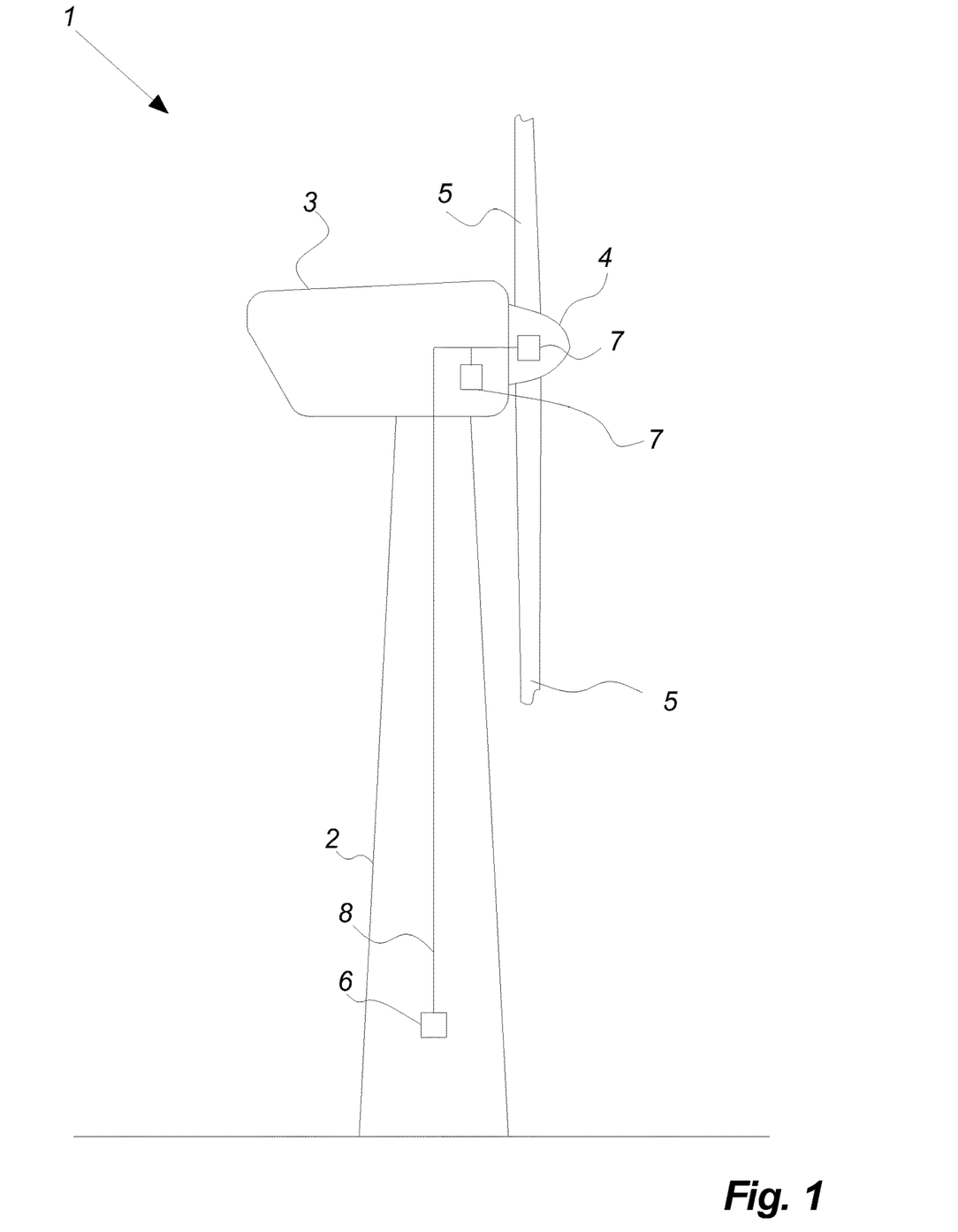
FIG. 1 illustrates a wind turbine according to an embodiment of the invention.

FIG. 1 illustrates an electrical power generating system in form of a variable speed wind turbine 1 according to an embodiment of the invention. The wind turbine 1 comprises a tower 2, a nacelle 3, a hub 4 and two or more blades 5. The blades 5 of the wind turbine 1 are rotatably mounted on the hub 4 at their respective root ends, together with which they are referred to as the rotor. The end of each blade 5 opposite the root end is the tip end. The rotation of a blade 5 along its longitudinal axial is referred to as pitch. The wind turbine 1 is controlled by a control system comprising a wind turbine controller 6, sub controllers 7 for controlling different parts of the wind turbine 1 and communication lines 8.

Figure 2:
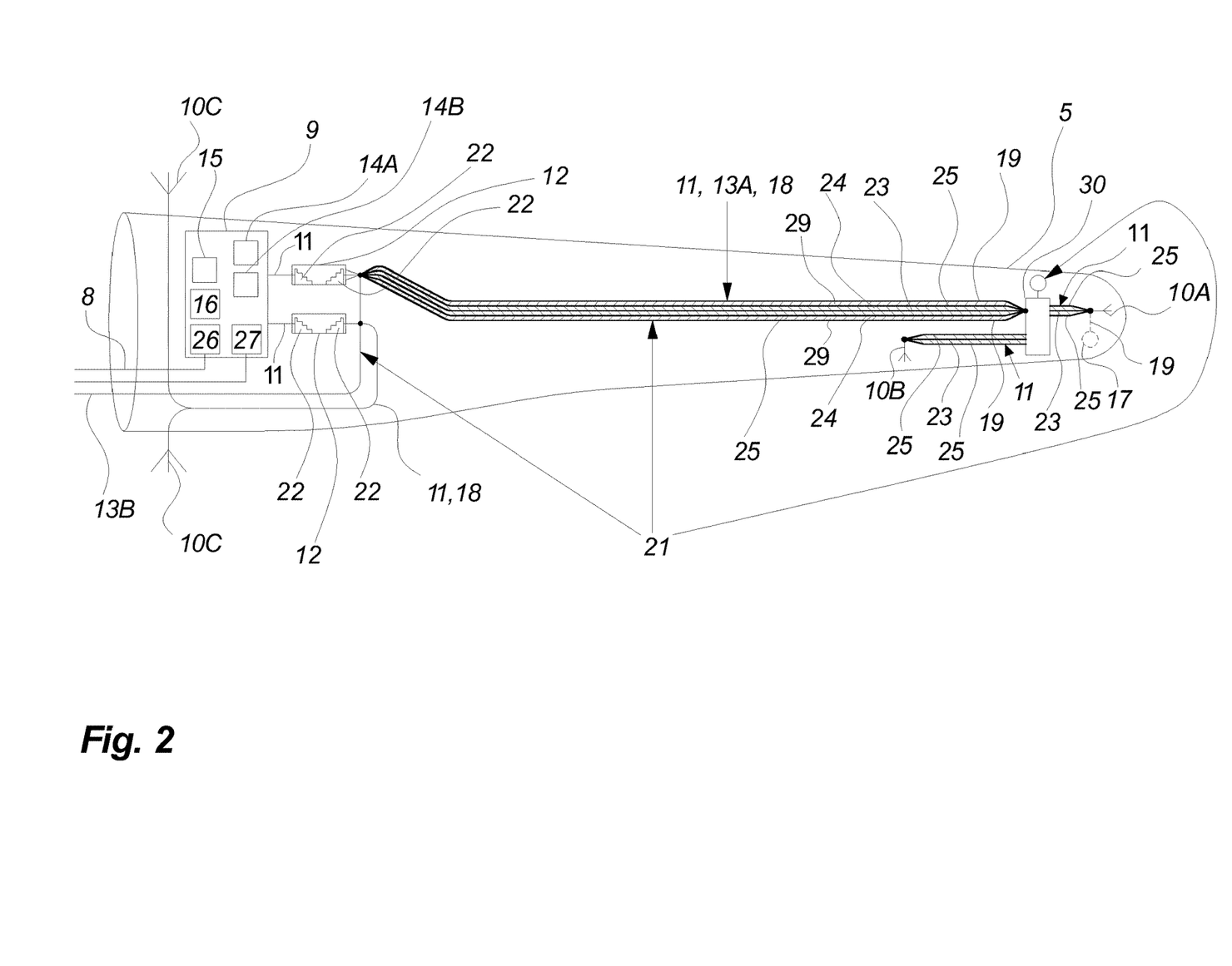
FIG. 2 illustrates a blade with a radio based measuring system according to an embodiment of the invention.

FIG. 2 illustrates a blade 5 of a wind turbine 1 according to an embodiment of the invention. The blade 5 is equipped with a radio based measuring system comprising communication device 9 protected from lightning currents by means of a waveguide 12, a conductor 11 and antennas 10. The communication device 9 preferably comprises at least a radio signal transmitter 14A, a radio signal receiver 14B and a data processor 15 for processing data including the received radio signal (especially the time the radio signal travels from transmitter 14A to receiver 14B is interesting to find and analyse). The radio signal transmitter/receiver 14 could be implemented as one device capable of both sending and receiving. The communication device 9 could also include additional elements such as e.g. a blade sensor 16 in the form of accelerometer and/or gyroscopes, etc.

The communication device 9 is communicating with the rest of the wind turbine control system 6, 7 preferably via optical communication means such as an optical fibre 8 connected to a data communication interface 26.

The communication device 9 is preferably powered via a power supply interface 27, which is galvanic insulated from the rest of the communication device 9.

The communication device 9 preferably transmits a radio signal via a tip antenna 10A, which is illustrated at the tip of the blade 5. The radio signal is received by one or more root antennas 10C placed near the root end of the blade 5. A further transmitting blade antenna 10B may also transmit a radio signal. Radio signals from additional (not illustrated) antennas could also be provided to/from the radio signal receiver/transmitter 14 of the communication device 9.

A radio signal-carrying conductor 11 is connected to the antennas 10. The conductor 11 is at the other end connected to a waveguide 12, which at the other end is connected to the communication device 9. In a preferred embodiment of the invention the radio transmitting device 14A is transmitting via waveguide 12 and conductor 11 a radio signal to the tip antenna 10A and if any preferably also to the blade antenna 10B. The tip antenna 10A transmits (transmit may in this application be interpreted as broadcast or communicated) the radio signal which is then received by one or more root antennas 10C and transmitted to the radio signal receiver 14B of the communication device 9. In alternative embodiments, the radio signal is transmitted from the blade antennas 10C to the tip antenna 10A/blade antenna 10B and via the conductor 11 and waveguide 12 to the communication device 9.

It should be noted that in an alternative configuration each of antennas 10C could be connected to separate waveguides 12.

Figure 3:
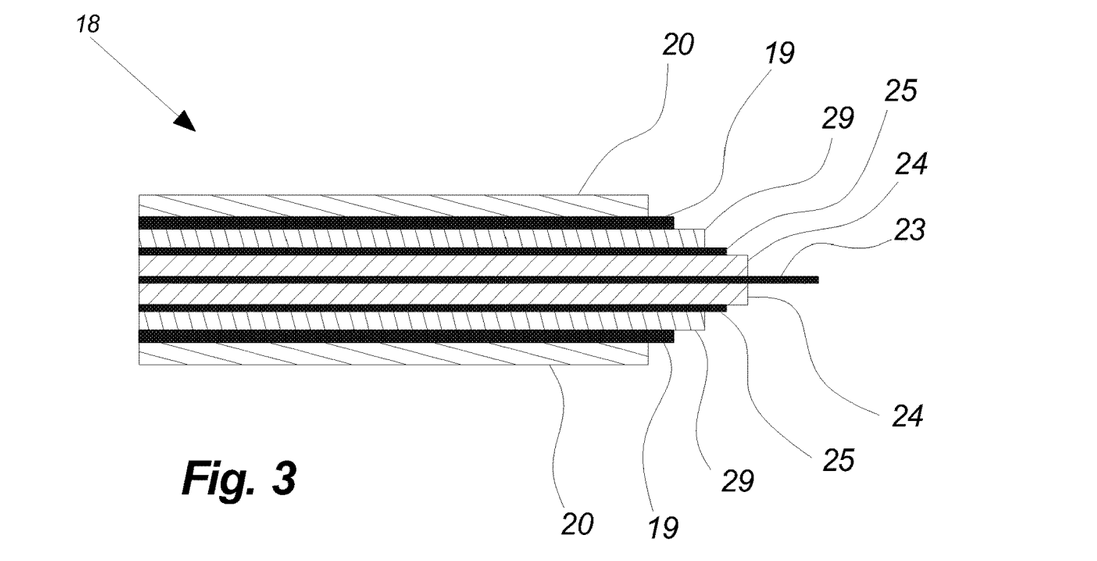
FIG. 3 illustrates a conductor according to an embodiment of the invention.

FIG. 3 illustrates the same type of conductor 11, 13 differently. The conductor 11, 13A, 18 between the waveguide 12 and the splitter 30 is illustrated by displaying the different layers of the conductor 11, 13A. The same is the case for the conductor 11, 18 from the splitter 30 to the blade antenna 10B just with less layers. The conductor 11, 18 from the waveguide 12 to the root antennas 10C is simply illustrated as a single line but are implemented as a multi-layered conductor as the above mentioned. The conductor 13B is preferably a standard down conductor with or without isolation layer. This different way of illustrating the conductor 11, 13 is simply to illustrate that it may be implemented differently i.e. the number of layers are not necessary the same in the entire blade depending on the purpose of the conductor cable. The conductor 11 is preferably implemented as a type of cable, preferably a coax cable 18.

It should be mentioned that if only one receptor 17 is located in the blade 5 it is preferred that a not illustrated second isolation layer 20 is applied outside the sock 19.

Figures 4A, 4B:
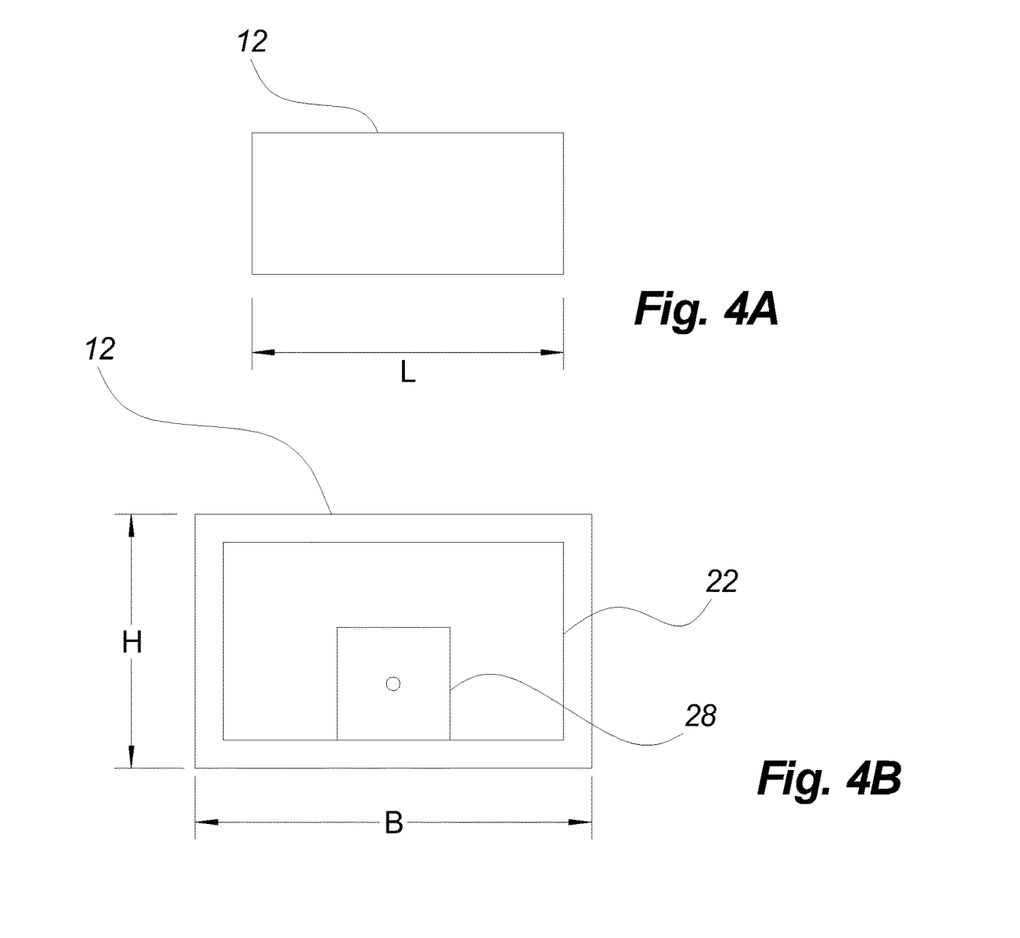
FIG. 4*a* illustrates a side view of waveguide according to an embodiment of the invention.
FIG. 4*b* illustrates a front view of waveguide according to an embodiment of the invention.

The waveguide 12 comprises an end launcher 22 to which the signal carrying conductor 23 is connected as described in relation to FIG. 4B.

The waveguide end launcher 22 is preferably a step type of end launcher 22 to which the inner conductor i.e. the signal-carrying conductor 23 of the radio signal carrying conductor 11 is connected. The end launcher 22 may as illustrated on FIG. 2 be implemented as one or more steps where the inner conductor 23 of a coax cable conductor 11, 18 is mounted. It should be mentioned that waveguides 12 without an end launcher 22 or with other implementations of end launchers 22 may also be used as lightning protection of the communication device 9. It is preferred to connect the coax cable to the end of the waveguide. An alternative solution is to connect the coax from the top of the waveguide to the "staircase" illustrated in FIG. 2 (element 22).

Preferably, the conductor 11 is a coax cable 18 but other types of radio signal carrying cables may also be used.

The communication device 9 may process the received information by means of the data processor 15 and pass the information further on via communication line 8 to a controller 6 or sub-controller 7. Alternatively, the information may also simply be passed through the communication device 9 to be processed at a controller 6 or sub-controller 7. The processing of information could include analysing time between transmitting and receiving the radio signal.

The communication device 9 may be powered by a power supply interface connected by a power cable to a power source preferably located in the hub 4.

One way of defining a lightning current is as a 200 kA pulse rising in 10 us and reduced to 50% after 350 us. A current pulse of this size may be very damaging to electronic equipment and disturb data communication/radio signals in general. Therefore, the communication device 9 has to be bypassed by such current pulse to avoid damage of components of the communication device 9.

Especially when the communication device 9 is located in the blade 5, it needs to be protected from high currents resulting from a lightning striking the blade. Therefore, a lightning protection system is implemented in the blade 5. At least one lightning receptor 17 is located in the blade 5 preferably towards the tip of the blade 5. This lightning receptor 17 is connected to a down conductor 13A conducting the lightning current from the receptor 17 down through the blade 5.

Preferably, a splitter 30 is located at the end of the conductor 11 where one or more of its conductors 23, 25 are short-circuited with the outer sock 19 constituting the down conductor 13A. In this way, all conductors of the conductor 11 participate in conducting the lightning current. From the splitter 30 receptors 17 and antennas 10 is connected.

According to an embodiment of the invention, the down conductor 13A is implemented as an outer sock 19 preferably of metal, which is covering or encapsulating the radio signal conductor 11. This is advantageous in that only one cable then needs to be mounted throughout the blade. To protect the communication device 9 the conductor 11 and down conductor 13A are terminated in one end at the waveguide 12. This termination enables the radio signal from the antennas 10 to continue via the waveguide 12 to the communication device 9. At the same time, the down conductor 13 is bypassing the waveguide 12 and continues the electric path from the receptor 17 via an additional down conductor 13B towards a ground potential.

The connection between the conductor 11 and the waveguide 12 is preferably made by means of soldering, brazing, welding or the like. Alternatively, a plug is mounted on the conductor 11 which fits a socket located at the waveguide 12 such plug should preferably comply with demands to plugs handling lightning currents. The down conductor 13A bypasses the waveguide 12, hence the down conductor 13A and the additional down conductor 13B are connected and the additional down conductor 13B conducts the lightning current further towards a ground potential round the waveguide 12.

According to an embodiment alternative to the above embodiment having separate inner signal carrying conductor 23 and outer sock 19 also referred to as metal sock 19 the blade measuring system may comprise a conductor 11, 13 where the inner signal carrying conductor 23, outer conductor 25 and metal sock 19 are short-circuited. In this way, the energy from a lightning striking a receptor 17 is conducted through the blade 5 partly in the signal carrying conductor 23, partly in the outer conductor 25 and partly in the metal sock 19.

According to this embodiment, then at the joint between the communication device 9 and the conductor 11, 13 the inner conductor 23, outer conductor 25 and metal sock 19 is again short. As described the inner conductor 23 is preferably guided to the interior of the waveguide 12 where it may be connected as described above. An additional down conductor 13B is preferably attached to the point of short circuit and thereby conducting the lightning current further around the communication device 9. In this way, the inner conductor 23 is short via the end launcher 22, which is conductively connected to the waveguide 12. Thereby the lightning protection is created in that the lightning current sees a short and bypasses the waveguide via conductor 13B and the radio signal is transformed between a wave in the coax and a wave in the waveguide.

In case of more than one lightning receptor 17, the conductors of the down conductor 13 and conductor 11 may be short at each lightning receptor 17. With this said it is preferred that only one receptor is used in the blade 5.

As mentioned the waveguide 12 separates the lightning current from the radio signal, the conductor 11, 13 and the communication device 9 "floats" at the same potential present at the junction between the conductors 11, down conductor 13 (preferably implemented as a sock 19, but could also be a separate cable) and waveguide 12. To obtain this floating potential of the communication device 9 it is preferred that the power supply and data communication to the communication device 9 is galvanic isolated from rest of the wind turbine. This could e.g. be obtained by the use of optic fibres and galvanic isolated connections to the communication device 9.

As indicated on FIG. 2 the communication device 9 is not limited to transmit, receive and forward a received (e.g. processed) signal. In embodiments of the invention, the communication device 9 also comprises one or more blade sensors for evaluating blade orientation such as pitch angle, azimuth angle, rotor speed etc.

Hence by using one or more waveguides as part of the signal passage from radio to antennas and vice versa the lightning related energy e.g. represented by a current is separated from the sensitive signals, radio and other electronic components.

FIG. 2 illustrates one tip antenna 10A, one blade antenna 10B and two root antennas 10C connected to one communication device 9 via conductors 11 and a plurality of waveguides 12. It should be mentioned that more antennas 10, conductors 11, communication devices 9 or waveguides 12 may be used if necessary even though not illustrated on FIG. 2. Also the relationship between conductors 11 and waveguides is preferably 1:1.

The antenna 10A illustrated closest to the tip end of the blade may also be referred to as tip antenna, the antenna 10B illustrated between the tip antenna 10A and the communication device 9 may be referred to as blade antenna 10B and the antenna located at the blade root may be referred to as root antenna 10C.

Furthermore, FIG. 2 illustrates part of a predefined lightning current path 21 from the tip end of the blade 5 to ground. The part illustrated on FIG. 2 is the part of the predefined lightning current path starting at the receptor 17 at the tip end of the blade 5 to an additional down conductor 13. Through the blade 5 the predefined lightning current path bypasses a waveguide 12 connected to a communication device 9, which is thereby also bypassed.

FIG. 3 illustrates an example of a conductor 11, 13 that is used to carry both radio signal to/from the antennas 10 and the lightning current from the receptor 17. The illustrated example is a coax cable 18 comprising a centre radio signal-carrying conductor 23, first isolating layer 24 and an outer conductor 25. These layers are typical layers of a coax cable 18. Such coax cable 18 may also be used as conductor 11 for communication between root antennas 10 and the communication device 9 and between splitter 30 and antennas 10.

On top of the outer conductor 25 a coax cable isolation layer 29 may isolate the coax cable 18 from the metal sock 19 which is intended for at least partly carrying the lightning currents through the blade in case a lightning strike. On top of the metal sock 19, an isolation layer 20 may be placed to limit risk of such lightning current "jumps" to other blade components instead of staying in the conductor 11, 13, 18.

The outer sock 19 may be configured with one or more layers (not shown) between the metal and the isolation layer 20. These one or more layers may comprise fabric or polymeric material and may be semi-conductive having a conductivity between the conductivity of the metal and the isolation layer 20.

Both the coax cable isolation layer 29 isolating the coax cable 18 from the metal sock 19 and the second isolation layer 20 isolating the metal sock 19 from the surroundings are optional. Hence, in some embodiments of the invention the conductor 11, 13 may only comprise an inner radio signal-carrying conductor 23, first isolating layer 24 and an outer conductor 25. With this said in some configurations where only one receptor 17 is placed in the blade the sock 19 and the second isolating layer 20 is recommended.

Hence by including the antenna system of a blade measuring system in a faraday cage construction such as a metal sock 19 as part of the lightning protection system it is ensured that the lightning energy (also referred to as lightning current) is passed around the antenna system. The antenna system may comprise the antennas 10, conductor 11 and communication device 9.

There are different types of waveguides for different types of waves and the preferred according to this invention is a hollow conductive metal pipe such as the one illustrated in a side view on FIG. 4A. The waveguide 12 may in addition have flanges (not illustrated) for fastening the waveguide 12 e.g. to the communication device 9. Such flanges may also be used for fastening the outer conductor 25 of the conductor 11 to the waveguide 12. In embodiments the outer sock 19 may also be fastened to such flange and thereby create a short between the outer conductor 25 and the outer sock 19.

Alternatively, such short could be facilitated by terminating the outer conductor 25 and the outer sock 19 in a terminal or soldering which is galvanic connected to the waveguide 12. The waveguide 12 is preferably connected by a conductor 11 to the communication device 9 but may also be attached to directly to the communication device 9.

FIG. 4B illustrates an end view of the waveguide 12. The signal-carrying conductor 23 is preferably terminated in a terminal 28, which is part of the end launcher 22, which is connected to the waveguide 12. Hence for the a lightning current the outer conductor 25, outer sock 19 and signal carrying conductor 23 is short via the end launcher 23 and waveguide 12. This is in contrast to the GHz radio signal which faces a 50 ohm resistance hence protection from lightning current is obtained.

It should be mentioned that the end launcher 22 may be implemented as a small antenna inside the waveguide 12 or the like. Further, it should be mentioned that the two end launchers 22 of the waveguide does not necessarily have to be of the same type.

A suitable waveguide 12 for a 3-5 GHx radio signal could be approximate 30×60×300 millimeters (H×W×L). The dimension of the waveguide 12 is determined based on the radio frequency which is used. Appropriated frequencies according to embodiments of the present inventions may e.g. be from 3 to 5 GHz or even higher.

Figure 5:
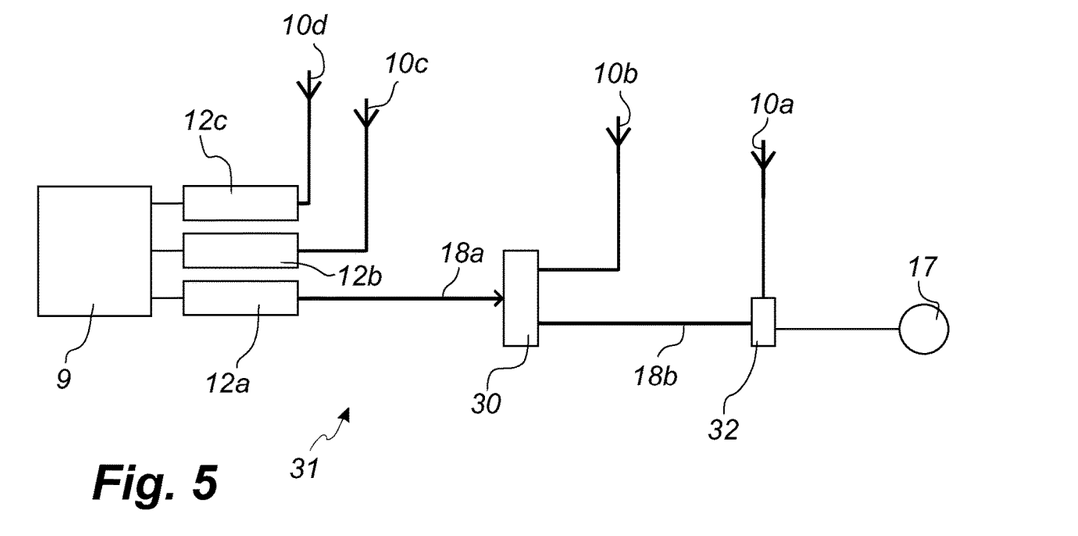
FIG. 5 is schematic drawing of a lightning protections system according to the present invention.

FIG. 5 is a schematic drawing of a lightning protection system 31 according to the present invention. It shows a communication device 9 connected to a tip antenna 10a, a blade antenna 10b and two root antennas 10c, 10d. A three-conductor cables 18a comprising a signal-carrying centre conductor, a coaxial shield and an outer sock, is arranged between waveguide 12a and splitter 30. The splitter 30 is further described below with reference to FIG. 6. Another three-conductor cable 18b interconnects the splitter and a ground return 32, the latter being connected to a lightning receptor 17 and to the tip antenna 10a. The purpose of the ground return 32 is to conduct the lightning current originating from the lightning receptor on its conductive housing to the three-conductor cable 18b, the ground return 32 providing a direct current short-circuit between the three conductors of cable 18b. Also, the ground return 32 transfers a radio signal originating from the communication device 9 to the tip antenna 10a. Each antenna is connected with a coaxial cable.

Figure 6:
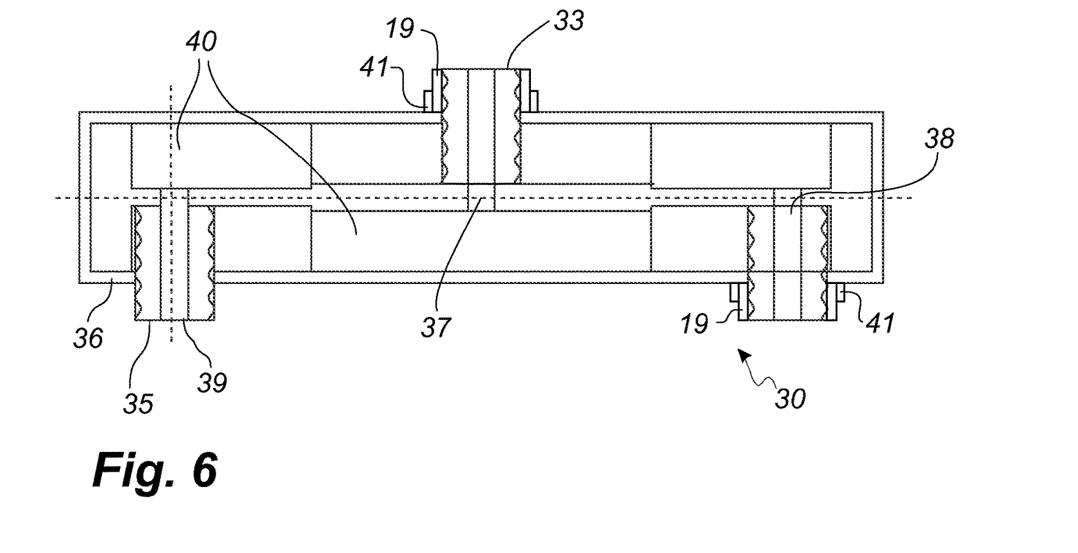
FIG. 6 is a cross-sectional view of a power splitter according to the present invention.

FIG. 6 is a schematic cross-section of a power splitter 30 according to the present invention. It has an input port 33 for connectively receiving a three-conductor cable, and two output ports 34, 35. The output port 34 is also adapted to connectively receive a three-conductor cable. The outer sock of the cable, i.e. the lightning down conductor 19, is clamped to the input port 33 by means of clamp 41 such that the sock is connected to the conductive housing 36 of the splitter 30. The other output port 35 is adapted to receive a signal carrying coaxial cable with a center conductor and a coaxial shield, the cable leading to an antenna. The power splitter 30 has a conductive housing 36 for transferring lightning current originating from the tip end, i.e. for output port 34, to the root end, i.e. input port 33. Conversely, a radio signal transmitted from the communication device is received in input port 33 and split within the device substantially equally to the output ports 34 and 35 by way of the inner conductors 37, 38, 39 being connected via the conductive staircase 40.

It will be understood by the skilled reader that the above-described embodiments are of exemplary nature only, and that other alternatives of implementing the present invention are conceivable.

LIST OF REFERENCE NUMBERS

1. Wind turbine
2. Tower
3. Nacelle
4. Hub
5. Blade
6. Wind turbine controller
7. Sub controller
8. Communication line
9. Communication device
10. Tip antenna (10A), Blade antenna (10B), Root antenna (10V)
11. Conductor
12. Waveguide
13. Down conductor (13A), Additional down conductor (13B)
14. Radio signal transmitter (14A), Radio signal receiver (14B)
15. Data processor
16. Blade sensor
17. Lightning receptor
18. Coax cable
19. Outer sock
20. Second isolation layer
21. Predefined lightning current path
22. End launcher
23. Signal carrying conductor
24. First isolating layer
25. Outer conductor
26. Data communication interface
27. Power supply interface
28. Terminal
29. Coax cable isolation layer
30. Splitter
31. Lightning protection system
32. Ground return
33. Input port
34. Output port
35. Output port
36. Housing
37. Centre conductor
38. Centre conductor
39. Centre conductor
40. Copper staircase
41. Clamp

The invention claimed is:

1. A wind turbine comprising at least one turbine blade and a lightning protection system, the turbine blade extending in a longitudinal direction parallel to a longitudinal axis and having a tip end and a root end, wherein the wind turbine comprises:

at least one communication device located within the wind turbine;

at least one antenna connected to the communication device;

at least one signal-carrying structure for transferring a signal between the communication device and the at least one antenna;

at least one waveguide interconnecting the communication device and the signal-carrying structure;

at least one lightning receptor; and at least one lightning down conductor connected to the lightning receptor for conducting lightning current to the root end of the blade for connection to a ground plane;

wherein the signal-carrying structure and the lightning down conductor are short-circuited at one or more locations within the blade.

2. The wind turbine according to claim 1, wherein the signal-carrying structure comprises one or more signal-carrying coaxial cables, each coaxial cable comprising a centre conductor surrounded by a first tubular insulating layer enclosed by a tubular shield conductor.

3. The wind turbine according to claim 2, wherein one or more of the signal-carrying coaxial cables is at least over part of its length integrated into a three-conductor cable comprising a second tubular insulating layer surrounding the tubular shield conductor, the second tubular insulating layer being surrounded by at least part of the lightning down conductor.

4. The wind turbine according to claim 1, wherein the signal-carrying structure comprises at least one power splitter for splitting and transferring radio frequency power, the power splitter comprising one input port and at least two output ports, each port being adapted to connectively receive a signal-carrying cable, wherein the input port is connected to each of the output ports such that a radio frequency signal received at the input port is split to the output ports.

5. The wind turbine according to claim 4, wherein the power splitter comprises a conductive housing connected to the input port to enable a direct current short circuit of the housing and the input port.

6. The wind turbine according to claim 4, wherein the signal-carrying structure is short-circuited with the lightning down conductor at the power splitter.

7. The wind turbine according to claim 4, wherein the input port and at least one of the output ports is adapted to connectively receive a three-conductor cable, wherein the three-conductor cable comprises a second tubular insulating layer surrounding the tubular shield conductor, the second tubular insulating layer being surrounded by at least part of the lightning down conductor.

8. The wind turbine according to claim 1, wherein the blade comprises two or more antennas placed at different longitudinal distances to the tip end of the blade, e.g. wherein the blade comprises a first and a second antenna, the first antenna being placed within 1 meter longitudinal distance from the tip end of the blade, and wherein the second antenna is placed between 4 and 10 meters longitudinal distance from the tip end of the blade.

9. The wind turbine according to claim 1, wherein the signal is a radio frequency signal.

10. A wind turbine blade comprising a lightning protection system, the wind turbine blade extending in a longitudinal direction parallel to a longitudinal axis and having a tip end and a root end, wherein the blade comprises:
   at least one communication device located within the blade;
   at least one antenna connected to the communication device;
   at least one signal-carrying structure for transferring a signal between the communication device and the at least one antenna;
   at least one waveguide interconnecting the communication device and the signal-carrying structure;
   at least one lightning receptor; and
   at least one lightning down conductor connected to the lightning receptor for conducting lightning current to the root end of the blade for connection to a ground plane;
   wherein the signal-carrying structure and the lightning down conductor are short-circuited at one or more locations within the blade.

* * * * *